US007004992B2

(12) United States Patent
Sugimori et al.

(10) Patent No.: US 7,004,992 B2
(45) Date of Patent: Feb. 28, 2006

(54) CHROMIUM-CONTAINING METAL AND METHOD FOR PRODUCING THE SAME

(75) Inventors: Hiroiti Sugimori, Shinminato (JP); Chitoshi Matsumura, Shinminato (JP); Satoaki Kawaguchi, Shinminato (JP); Masanori Kato, Shinminato (JP)

(73) Assignees: JFE Steel Corporation, Tokyo (JP); JFE Material Co., Ltd., Tokyo (JP)

( * ) Notice: Subject to any disclaimer, the term of this patent is extended or adjusted under 35 U.S.C. 154(b) by 323 days.

(21) Appl. No.: 10/220,886

(22) PCT Filed: Mar. 6, 2001

(86) PCT No.: PCT/JP01/01721

§ 371 (c)(1), (2), (4) Date: Sep. 5, 2002

(87) PCT Pub. No.: WO01/66809

PCT Pub. Date: Sep. 13, 2001

(65) Prior Publication Data

US 2003/0110886 A1    Jun. 19, 2003

(30) Foreign Application Priority Data

Mar. 7, 2000  (JP)  ............. 2000-067133
Mar. 5, 2001  (JP)  ............. 2001-059956

(51) Int. Cl.
*C22C 1/06* (2006.01)
(52) U.S. Cl. ........................................ 75/10.5
(58) Field of Classification Search ............ 75/10.5, 75/423; 420/428
See application file for complete search history.

(56) References Cited

U.S. PATENT DOCUMENTS 4,504,310 A * 3/1985 Boulier .................. 76/623
5,882,375 A * 3/1999 Edlinger et al. ........... 75/10.35
5,886,067 A * 3/1999 Li et al. .................... 420/428

FOREIGN PATENT DOCUMENTS

| JP | 52-30211 A | 3/1977 |
| JP | 52-123313 A | 10/1977 |
| JP | 55-11146 A | 1/1980 |
| JP | 56-102368 A | 8/1981 |
| JP | 60-36632 A | 2/1985 |
| JP | 62-47435 A | 3/1987 |
| JP | 62-47436 A | 3/1987 |
| JP | 62-47437 A | 3/1987 |
| JP | 58-7700 | 3/1988 |
| JP | 2-236238 A | 9/1990 |

OTHER PUBLICATIONS

S.H. Sully, "Chromium", *Metallurgy of the Rarer Metals*, (1954), pp. 28-29, Butterworths Scientific Publications, London, England.

* cited by examiner

*Primary Examiner*—Melvyn J. Andrews
(74) *Attorney, Agent, or Firm*—Frishauf, Holtz, Goodman & Chick, P.C.

(57) ABSTRACT

The high-Cr-containing metal according to the present invention is a chromium-containing metal manufactured in an arc melting furnace, and contains at least 85% Cr, up to 0.005% Al, up to 0.1% Si, and up to 0.002% S. The manufacturing method of this high-Cr-containing metal comprises the steps of reducing chromium oxides heated and melted in the arc melting furnace with Si, obtaining a molten metal containing at least 85% Cr, then, discharging slag generated in this Si reduction from the arc melting furnace, adding a basic flux into the arc melting furnace after discharging slag, melting the basic flux by electric arc, refining the molten metal by contacting the slag generated through melting of the basic flux with the molten metal, and then, tapping the molten metal from the arc melting furnace and cast.

6 Claims, No Drawings

CHROMIUM-CONTAINING METAL AND METHOD FOR PRODUCING THE SAME

This application is a U.S. National Phase Application under 35 U.S.C. 371 of International Application No. PCT/JP01/01721 filed Mar. 6, 2001.

TECHNICAL FIELD

The present invention relates to high-purity metal chromium and ferrochromium used in electronic materials and corrosion-resistant and heat-resistant superalloys and so on, and a manufacturing method thereof.

BACKGROUND ART

High-purity metal chromium and ferrochromium low in impurities are used for electronic materials and corrosion-resistant and heat-resistant super alloys. In the present invention, these metal chromium and ferrochromium are generically called "chromium-containing metals". An economically available ore serving as a chromium source of the chromium-containing metal is chromite ($FeO \cdot Cr_2O_3$). Because it contains much iron, however, the upper limit of the Cr content in ferrochromium obtained from chromite is about 72 mass %. It is therefore the general practice to use chromium oxide ($Cr2O3$) available by refining chromite as a raw material for metal chromium.

The known manufacturing methods of metal chromium include the aluminum-thermit process of reducing powdery chromium oxide with powdery metal aluminum, as disclosed in Japanese Unexamined Patent Application Publication No. 60-36632, the silicon reduction process of melting chromium oxide in an arc furnace and reducing the same with metal silicon, as disclosed as a manufacturing method of high-purity chromium-iron alloy in Japanese Examined Patent Publication No. 58-7700, and the electrolytic reduction process of electrolytically reducing a chromate solution and causing precipitation of metal chromium on the cathode in Japanese Unexamined Patent Application Publication No. 62-47436. These known manufacturing methods have respective advantages and disadvantages.

In the aluminum-thermit process, for example, it is possible to manufacture metal chromium easily in a simple equipment. This is however based on a batch process, resulting in a small throughput per batch, a low production efficiency, and the process uses expensive metal aluminum as a reducing agent, thus leading to a high manufacturing cost. Aluminum serving as a reducing agent remains in the manufactured metal chromium. Furthermore, the strong reducing atmosphere causes reduction of refractory constituents used for furnace lining, and the reduced constituents are entangled into the metal chromium, posing problems in purity.

In the silica reduction process, metal silicon serving as a reducing agent is lower in price than metal aluminum, and can reduce oxygen with a stoichiometrically smaller amount than aluminum. It is therefore possible to manufacture metal chromium at a lower cost than in the aluminum-thermit process even by taking into account the consumption for heating chromium oxide. In addition, continuous production in an arc furnace is also possible at a high production efficiency. The silicon reduction process is more advantageous than the aluminum-thermit process also in this term. It has however a serious quality problem in that silicon serving as a reducing agent remains in an amount of about 0.7 mass % in the manufactured metal chromium.

In the aluminum-thermit process and the silicon reduction process, if metal chromium is manufactured in a state of insufficient reduction by using a small amount of metal aluminum or metal silicon serving as a reducing agent, the amount of aluminum or silicon remaining in metal chromium decreases. However, this leads to a deteriorated reduction yield of chromium oxide and an increase in the amount of oxygen in manufactured metal chromium, thus causing another problem in manufacturing cost and in quality.

The electrolytic reduction process permits manufacture of relatively high-quality metal chromium. Because of the use of $Cr_2(SO_4)_3$ as an electrolyte, however, manufactured metal chromium contains sulfur as much as 0.02 to 0.03 mass %. Further because this is aqueous solution electrolysis, the manufactured metal chromium contains from 0.3 to 1 mass % oxygen, and from 0.02 to 0.05 mass % nitrogen. Necessity of many treatments for refining the chromate solution results in economic problems such as complicated manufacturing steps, a high equipment cost, and a large power consumption.

A ferrochromium having a chromium content of at least 72 mass % cannot be manufactured in a single run alone of reduction-refining of chromite as described above. It is therefore the common practice to deiron the once manufactured ferrochromium through an acid treatment or the like, as is disclosed in Japanese Unexamined Patent Application Publication No. 6-4897. However, the conventional deironing treatment, including this method, cannot be considered to be high in production efficiency because of complicated treatment process.

Requirements for a chromium-containing metal as typically represented by metal chromium used in electronic materials and corrosion-resistant and heat-resistant superalloys are achievement of a higher purity and reduction of manufacturing cost. Regarding these requirements, the chromium-containing metals manufactured by the conventional methods mentioned above contain much impurity elements, and requires a higher manufacturing cost according as the purity is higher, and cannot be considered to satisfy these requirements.

DISCLOSURE OF INVENTION

The present invention was developed in view of these circumstances as described above, and has an object to provide a method for economically and efficiently manufacturing a chromium-containing metal having slight contents of impurities such as aluminum, silicon and sulfur, and to provide a chromium-containing metal having small contents of impurity elements, manufactured by this manufacturing method.

The present inventor carried out studies to find a method for efficiently manufacturing a chromium-containing metal having small contents of impurities and applicable for electronic materials and corrosion-resistant and heat-resistant superalloys at a low cost. They paid attention to the silicon reduction process having the smallest cost variation from among the conventional arts, and examined a method for removing silicon remaining in molten metal in the silicon reduction process. As a result, the following findings were obtained; silicon can be easily removed by producing a molten metal by the silicon reduction process, and after discharging slag, conducting refining in the presence of an appropriate flux. The findings suggested the possibility to manufacture a chromium-containing metal having small contents of aluminum, silicon and sulfur.

The present invention was developed on the basis of the above-mentioned findings, and provides a manufacturing method of a chromium-containing metal, comprising a first step of reducing a chromium oxide with silicon to obtain a molten metal; and a second step of, after discharging slag produced in the first step, adding a basic flux to refine the molten metal.

An embodiment of the manufacturing method of a chromium-containing metal of the invention comprises the steps of reducing a chromium oxide heated and melted in an arc melting furnace with silicon to obtain a molten metal containing at least 85 mass % chromium; then, discharging slag produced by silicon reduction from the arc melting furnace: newly adding, after discharge of slag, a basic flux into the arc melting furnace to melt the basic flux by electric arc; refining the molten metal by contacting slag produced by melting of the basic flux with the molten metal; and then, tapping the molten metal from the arc melting furnace and casting the same.

Because CaO has a high desulfurization ability and is available at a low cost, the basic flux should preferably mainly comprise CaO. Application of a heating treatment in a vacuum atmosphere eliminates gas constituents such as nitrogen and oxygen in the chromium-containing metal and permits manufacture of a high purity chromium-containing metal. Therefore, it is desirable to crush the cast chromium-containing metal, and subject the crushed chromium-containing metal to a vacuum heating treatment. By this treatment, it is possible to achieve a nitrogen content of up to 0.005% in the chromium-containing metal. Furthermore, it is desirable to crush a chromium-containing metal, form the crushed metal into briquettes, and subject the resulting briquettes to a vacuum heating treatment.

In the present invention, a chromium-containing metal is manufactured by reducing a chromium oxide such as chromium oxide ($Cr_2O_3$) or chromite in a first step and refining a molten metal after discharging slag with a basic flux in a second step. Since manufacture is accomplished without using aluminum as a reducing agent, the aluminum content in the manufactured chromium-containing metal can be kept at up to 0.005 mass % (hereinafter simply denoted as "%"). Because silicon is used as a reducing agent, while silicon is contained in an amount of about 0.2 to 1.0% in the molten metal immediately after reduction-smelting, refining with the basic flux finally permits reduction to below 0.1%. The produced molten metal is refined with the basic flux. Sulfur contained in the molten metal is therefore removed into the basic flux, and the manufactured chromium-containing metal can have a sulfur content of up to 0.002%.

More specifically, the chromium-containing metal of the invention solves, in terms of quality, the problem of the aluminum content in the aluminum-thermit process, the problem of the silicon content in the silicon reduction process, and the problem of the sulfur content in the electrolytic reduction process, and in terms of the manufacturing cost, permits continuous production in an arc melting furnace, and production at a lower cost as compared with the aluminum-thermit process and the electrolytic reduction process because of the use of low-cost silicon as a reducing agent.

The silicon reduction process conventionally used for the manufacture of ferrochromium is a single-stage refining process comprising the steps of charging a chromium oxide, silicon and a basic flux into an arc melting furnace, and refining the charged raw materials while heating. The manufacturing method of the present invention, in contrast, is a two-stage refining method comprising the steps of reducing a chromium oxide with silicon in the first step, and refining the molten metal with a basic flux after discharging slag in the second step.

The conventional silicon reduction process has a problem of a high silicon content. If the chromium-containing metal is manufactured in a state of insufficient reduction by reducing the amount of metal silicon as a reducing agent (known as a weak reduction state), there would be a decrease in reduction yield of chromium oxide, although the amount of silicon remaining in the metal chromium is reduced to some extent. A smaller amount of blended metal silicon serving as a reducing agent keeps a high concentration of chromium oxide in slag during operation. This results in an increase in viscosity of slag during operation, which in turn leads to a lower rate of the reducing reaction, and hence to a higher concentration of chromium oxide in slag after operation. Since there is a correlation between the amount of chromium oxide in slag and the oxygen content in metal chromium, there is encountered a problem in that a smaller amount of metal silicon as a reducing agent results in an increase in oxygen content in metal chromium.

In the conventionally used silicon reduction process, if a basic flux is charged in a large quantity at a time for reducing the silicon content, a problem is caused in that the amount of slag increases, and the silicon content is not stable.

In the two-stage refining method of the present invention, in contrast, produced slag is discharged after the first step. There is a correlation between the silicon oxide content in slag and the oxygen content in metal chromium, and between the chromium oxide content in slag and the oxygen content in metal chromium. Discharge of slag after the first step can prevent the oxygen content in metal chromium from increasing. By refining the molten metal by use of a basic flux newly charged, it is possible to reduce not only the silicon content in metal chromium, but also the oxygen content. The reduction yield of chromium oxide never decreases, and the oxygen content in metal chromium is also reduced.

The present invention is particularly suitably applicable to a high-chromium-containing metal containing at least 85% chromium. For chromium-containing metals used in electronic materials and corrosion-resistant and heat-resistant superalloys, there is only a small demand for ferrochromium of a low chromium grade of under 85%.

The chromium-containing metal of the invention, manufactured in an arc melting furnace, comprises at least 85 mass % chromium, up to 0.005 mass % aluminum, up to 0.1 mass % silicon, and up to 0.002 mass % sulfur.

An embodiment of the chromium-containing metal of the invention, manufactured in a combination of an arc melting furnace and a vacuum treatment equipment, comprises at least 85 mass % chromium, up to 0.005 mass % aluminum, up to 0.1 mass % silicon, up to 0.002 mass % sulfur, and up to 0.005 mass % nitrogen.

The chromium-containing metal should preferably be manufactured through reduction of a chromium oxide with silicon.

The manufacturing method of a chromium-containing metal of the invention comprises the steps of using, as a raw material, a chromium-containing metal containing at least 85 mass % chromium, at least 0.005 mass % aluminum, or at least 0.1 mass % silicon, or at least 0.002 mass % sulfur, adding a basic flux to this raw material, and melting and refining the same in a melting furnace.

Furthermore, the chromium-containing metal of the invention is manufactured by using, as a raw material, a chromium-containing metal comprising at least 85 mass % chromium, at least 0.005 mass % aluminum, or at least 0.1 mass % silicon, or at least 0.002 mass % sulfur, adding a basic flux to this raw material, and melting and refining the same in a melting furnace, comprising at least 85 mass % chromium, up to 0.005 mass % aluminum, up to 0.1 mass % silicon, and up to 0.002 mass % sulfur.

BEST MODE FOR CARRYING OUT THE INVENTION

The present invention will now be described in detail. In the invention, chromium oxide ($Cr_2O_3$) and/or chromite are used as a chromium oxide serving as a chromium source, and at least any one of metal silicon, ferrosilicon, and silico-chromium (Si—Cr) is used as a reducing agent. Since, among these raw materials, chromite, ferrosilicon, and silico-chromium contain much iron, chromium oxide and metal silicon are used when manufacturing metal chromium. As required, a raw metal manufactured by the aluminum-thermit process or the silicon reduction process may be mixed with chromium oxide as a melting raw material, or furthermore, any of various metals containing chromium may be mixed within a range not deviating from the scope of the present invention. Metal chromium as herein used means a chromium-containing metal having a chromium content of at least 99.0%.

When manufacturing a chromium-containing metal having a chromium content within a range of from 85 to 99.0%, i.e., ferrochromium, chromium oxide and metal silicon are used as main raw materials. Because iron may be added in response to the grade of chromium, the chromium content is adjusted so as to achieve the target content by mixing chromite, or mixing ferrosilicon and silico-chromium. Since chromium oxide has a melting point of 1,990° C., it is difficult to melt it in an arc melting furnace unless a flux is added. The reduction efficiency of chromium oxide is higher according as the basicity of slag ($CaO/SiO_2$) is higher. In order to ensure operation by melting silicon oxide ($SiO_2$) produced through silicon reduction, a flux should preferably be added. For these reasons, upon melting chromium oxide, it is desirable to use a flux mainly comprising CaO such as quicklime or limestone (hereinafter referred to as a "CaO-based flux"). Use of a CaO-based flux is advantageous also in that the produced molten metal is desulfurized. The amount of added CaO-based flux should preferably be such that the slag basicity upon the completion of silicon reduction is within a range of from 1.3 to 3.0. A strong reducing agent such as aluminum may be used as a part of the reducing agent to an extent that it does not remain in the molten metal. More specifically, while metal silicon is used as a main raw material in terms of the kind of reducing agent, aluminum mainly containing silicon, or carbon mainly containing silicon may of course be used in mixture in response to the grade and the quantity of heat generation. For the purpose of adjusting the slag melting point, fluorspar ($CaF_2$) or the like may be added in mixture.

Chromium oxide, a reducing agent, and CaO-based flux selected in response to the chromium grade are charged in an arc melting furnace, and melted by electric heating. The arc melting furnace should be tiltable for tapping the produced molten metal and discharging molten slag. The arc melting furnace should preferably be of the cartridge type in which the furnace lining is replaceable, for melting while holding the raw materials therein so that different products of various grades of chromium can be manufactured in the same arc melting furnace without causing mutual contamination of constituents. The power source for generating arc may be DC or AC, and magnesia stamps or the like may be used as lining refractories.

In the arc melting furnace, contact of a graphite electrode with the charge, particularly molten metal resulting from the reducing reaction upon heating and melting causes an increase in the carbon content in the resultant molten metal. It is therefore desirable to prevent carbon pickup from the graphite electrode as far as possible by adopting the high-voltage operation and using a long distance between the graphite electrode and the charged raw materials.

When charging these raw materials into the arc melting furnace, chromium oxide, the reducing agent, and the CaO-based flux may be charged after mixing them uniformly. In this case, however, the produced molten metal and the graphite electrode often come into contact with each other. Therefore, for the purpose of preventing carbon pickup from the graphite electrode, it is desirable to avoid contact between the produced molten metal and the graphite electrode as far as possible by spreading the reducing agent over the hearth, installing the graphite electrode so that the reducing agent and the graphite electrode are electrically connected, charging the mixture of chromium oxide and the CaO-based flux so as to cover the reducing agent and the graphite electrode, so that the reducing reaction occurs below the graphite electrode.

The reducing agent comprising metal silicon, ferrosilicon or silico-chromium melted by energizing and heating reacts with chromium oxides comprising chromium oxide or chromite. Reduction by silicon proceeds while generating $SiO_2$, and a molten metal containing at least 85% chromium is produced in the arc melting furnace. Chromium oxides react with the CaO-based flux through electrical heating, leading to a lower melting point of chromium oxides, thus accelerating the reducing reaction of chromium oxides by silicon. $SiO_2$ produced from the reducing reaction, the CaO-based flux and the chromium oxides react to form molten slag (known also as "primary slag") which cover the molten metal.

In the silicon reduction process, silicon contained in the molten metal and chromium oxide in the molten slag are in equilibrium. That is, addition of the reducing agent in excess for increasing the silicon content in the molten metal result in a decrease in the chromium oxide content in molten slag. If the silicon content in the molten metal is increased excessively, however, removal of silicon from the molten metal, the next step, becomes complicated. According to experience of the present inventors, with a silicon content in the molten metal of at least 0.2%, chromium oxide in molten slag decreases sufficiently. Even with a silicon content in the molten metal of 1.0% or higher, the reducing reaction is saturated, and chromium oxide in molten slag does not decrease so much. It is therefore recommendable to achieve a silicon content in molten metal within a range of from 0.2 to 1.0% after the completion of the reducing reaction by silicon, i.e., to determine blending ratios of metal silicon, ferrosilicon or silico-chromium in the reducing agent so that the silicon content after the completion of silicon reducing reaction is within a range of from 0.2 to 1.0%, or preferably, from 0.4 to 0.8%. The reduction yield in this silicon reduction was confirmed to well bear comparison with that in the aluminum-thermit process.

It is not necessary to charge the reducing agent into the arc melting furnace simultaneously with the chromium oxides. The chromium oxides may previously be melted in the arc melting furnace, and then, the reducing agent may be added into the arc melting furnace for silicon reduction.

The chromium oxides are thus silicon-reduced, thereby completing the silicon reduction of the chromium oxides. The timing of completion of reducing reaction may be determined from chromium analytical value of molten metal or molten slag by taking an analytical sample from molten metal or molten slag (primary slag), or may be empirically determined from the power turn-on time or the power consumption.

Then, molten slag is discharged by tilting the arc melting furnace. It is not necessary to completely discharge molten slag generated from silicon reduction, but it suffices to discharge more than 50% of primary slag produced. However, a large quantity of primary slag remaining in the arc melting furnace leads to a large quantity of basic flux to be added next. The largest possible quantity of primary slag should therefore preferably be discharged.

Chromium in an oxide form is contained in an amount of several % in the primary slag. Non-collection thereof leads to a loss in chromium yield. It is therefore desirable to add metal silicon, ferrosilicon or silico-chromium into the discharged primary slag to reduce chromium oxides remaining in the primary slag and collect it as silico-chromium. Collected silico-chromium can be used as a reducing agent of chromium oxides in the arc melting furnace in place of the above-mentioned reducing agent.

The present inventors have confirmed that slag is not weathered with a basicity of up to 1.5. Therefore, when using primary slag after cooling as a subgrade material, the basicity of primary slag should preferably be within a range of from 1.3 to 1.7 if chromium is collected by adding a reducing agent to primary slag, or within a range of from 1.3 to 1.5 if chromium in primary slag is not collected. When chromium is collected, reduction with silicon, the basicity of 1.7 is finally decreases to below 1.5.

After discharging primary slag from the arc melting furnace, a basic flux is added into the arc melting furnace. Any flux mainly comprising a basic constituent such as CaO or MgO may be used as the basic flux. With a view to desulfurizing the molten metal, a flux mainly comprising CaO such as CaO—$CaF_2$ is preferable.

After adding the basic flux, power is turned on again to melt the basic flux to fuse primary slag remaining in the furnace and the basic flux. A high basicity slag (known as "secondary slag") is formed, and refining is performed by bringing the secondary slag and the molten metal into contact. Contact between the secondary slag added with the basic flux and the molten metal causes a reaction between silicon and oxygen in the molten metal. $SiO_2$ is produced, and there is accomplished removal of silicon in the molten metal, i.e., a desiliconization treatment. The reaction in the meantime causes a part of chromium in the molten metal to be oxidized and transfer into slag. If oxygen remains in secondary slag in the form of $Al_2O_3$ or $SiO_2$, carbon of the electrode reduces $Al_2O_3$ or $SiO_2$, and aluminum or silicon enters into the molten metal as impurities. To prevent this inconvenience, the largest possible amount of primary slag should preferably be discharged.

In the secondary slag produced by the addition of the basic flux, the slag basicity decreases under the effect of $SiO_2$ generated from the desiliconization treatment. In this case, the slag basicity after the desiliconization treatment should preferably be at least 2.0 for the purpose of desulfurization of the molten metal. It is therefore desirable to determine an amount of added basic flux so as to keep a slag basicity of 2.0 after the desiliconization treatment. It is not particularly necessary to limit the upper limit of basicity. Because the desulfurization ability is saturated even at a basicity of over 10.0, it suffices to set an upper limit to up to about 10.0.

Upon the completion of the desiliconization treatment of the molten metal by secondary slag, power is turned off, and the molten metal and secondary slag are discharged into a holding vessel such as a ladle. Determination of the completion of the desiliconization treatment can be accomplished accurately by taking an analytical sample from the molten metal to carry out an analysis of silicon in the molten metal. Completion of the reaction is possible also from analysis of secondary slag. When the quantity of secondary slag is large, only secondary slag is first discharged, and then, the molten metal is tapped. The tapped metal is cast from the holding vessel into a mold made of cast iron. Metal chromium has a solidification point of 1,890° C., and ferrochromium containing at least 85% chromium has also a high melting point. In order to protect the mold, therefore, it is desirable to spread crushed primary or secondary slag collected during manufacture or crushed magnesia or the like in the mold. When the molten metal can be cast directly from the arc melting furnace into the mold, it is not necessary to tap once into the holding vessel, but the tapped molten metal can be cast directly into the mold.

Secondary slag also contains several % chromium in the form of oxides, and secondary slag has a high basicity. They may therefore be weathered if held as they are. By collecting secondary slag, and charging the collected secondary slag together with raw materials such as chromium oxides into the arc melting furnace to conduct silicon reduction, the chromium yield is improved, and the amount of added quicklime can be curtailed. In the course of this refining, a slight amount of carbonaceous material such as coke may be added to adjust the balance between the carbon content and the oxygen content prior to the vacuum heating treatment described later.

After casting, the cooled ingot is taken out from the mold. Slag adhering to the ingot surface is ground off by shot blast or the like. Subsequently, the ingot is crushed to a size passing through a mesh of about 50 mm by means of several kinds of crusher. The thus obtained chromium-containing metal has an aluminum content of up to 0.005%, a silicon content of up to 0.1%, and a sulfur content of up to 0.002%. As a high-purity product, however, the oxygen content and the nitrogen content must be considered to be slightly higher. These gaseous constituents are therefore removed by a vacuum heating treatment in a vacuum treatment equipment.

A vacuum treatment equipment of any type may be used so far as the pressure in a vacuum vessel is up to 133 Pa (1 torr), and a charge in the vacuum vessel can be heated to a temperature of at least 1,200° C.

Crushed chromium-containing metal is charged into the vacuum vessel, the pressure is reduced, and heating is started in a vacuum state. The charge is held under conditions including a pressure of up to 133 Pa and a temperature of at least 1,200° C. for a prescribed period of time. As a result of this vacuum heating treatment, in the chromium-containing metal, oxygen reacts with carbon and the resultant CO gas is removed. Nitrogen is removed as N2 gas, and the nitrogen content becomes 0.005% or lower. The pressure, the temperature and the holding time in the vacuum vessel in the vacuum heating treatment, varying with the combination of these three factors and specifications of the vacuum treatment equipment, cannot necessarily be limited in a generalized manner. According to experience of the present inventors, it was confirmed to be possible to manufacture a chromium-containing metal having a desired chemical composition under conditions including a pressure in the vacuum vessel of up to 7 Pa (0.05 torr), a temperature of 1,350° C., and a holding time of 50 hours. After the vacuum heating treatment, oxidation of the chromium-containing metal is prevented by cooling the metal in the vacuum vessel to a temperature at which air oxidation is not caused. After cooling, as required, the metal is crushed to a smaller size to prepare a product. For the purpose of improving the degassing efficiency caused by the vacuum heating treatment, furthermore, and to improve uniformity of degassing, a crushed chromium-containing metal should preferably be used. As required, it is desirable to add a carbonaceous material serving as a reducing agent such as carbon powder, add a lump-making agent (coking additive), knead and form the same into briquettes, and then to carry out the vacuum heating treatment.

By manufacturing a chromium-containing metal containing at least 85% chromium, it is possible to efficiently and stably manufacture at a low cost a chromium-containing metal having a low contents of impurity elements such as aluminum, sulfur, silicon, carbon, oxygen and nitrogen, particularly low contents of aluminum, silicon and sulfur, which is unavailable by the conventional aluminum-thermit process, the silicon reduction process or the electrolytic reduction process.

Phosphorus and iron in the manufactured chromium-containing metal (ferrochromium containing much iron has no problem) are brought about from chromium oxide, metal silicon and quicklime used as raw materials. It is therefore desirable to select raw materials having low contents of phosphorus and iron.

Another embodiment of the present invention will now be described. The aforementioned embodiment has covered a manufacturing method of a chromium-containing metal comprising a first step of obtaining a molten metal through reduction of chromium oxides with silicon in a melting furnace, and a second step of, after discharging slag generated in the first step from the melting furnace, newly adding a basic flux into the melting furnace to refine the molten metal. However, a chromium-containing metal containing at least 85 mass % chromium, not chromium oxide, and having an aluminum content of at least 0.005 mass %, a silicon content of at least 0.1 mass %, and a sulfur content of at least 0.002 mass % may be used as a raw material, and this raw material may be melted and refined in the arc melting furnace by adding a basic flux thereto. That is, a chromium-containing metal, containing impurities, manufactured by the aluminum-thermit process or the silicon reduction process may by used as a raw material, and refining only of the second step may be carried out by adding a CaO-based flux, fluorspar or the like to the raw material. According to this manufacturing method, it is possible to obtain a chromium-containing metal not containing much impurities, including up to 0.005 mass % aluminum, up to 0.1 mass % silicon, and up to 0.002 mass % sulfur.

The present invention is not limited to the embodiments mentioned above, but applicable to various other variants. The invention is applicable for the manufacture of ferro-chromium having a chromium content of under 85%. A high-frequency melting furnace, a low-frequency melting furnace, a resistance furnace or a plasma melting furnace other than an arc melting furnace may be used as a melting furnace. In the second step, after refining the molten metal with a basic flux and discharging slag, it is possible to adopt a multi-stage refining process such as the three-stage refining process comprising an additional third step of refining the molten metal after discharging slag with a basic flux, thereby further reducing the silicon content and the oxygen content.

EXAMPLE 1

The following paragraphs describe an example in which metal was manufactured in a 4,000 kVA three-phase AC arc melting furnace having a melting furnace body of the cassette type. This arc melting furnace has a structure in which only the melting furnace body is tiltable.

Lumpy metal silicon in an amount of 1,350 kg screened to 20 mm under was spread over the hearth of the melting furnace body, and a graphite electrode was installed in contact with this metal silicon. A mixture prepared by previously mixing 5,000 kg powdery chromium oxide and 4,500 kg granular quicklime screened to 20 mm under was charged into the furnace so as to cover the metal silicon and the graphite electrode. Heating was started by turning on the electrode. When the charge level in the melting furnace went down as a result of heating and melting, melting was continued while additionally charging the mixture of chromium oxide and quicklime, and silicon reduction was completed in about 4 hours and 30 minutes. A basicity of 1.55 was set as a target for the primary slag upon the completion of silicon reduction.

Primary slag was discharged by tilting the melting furnace body. Discharged primary slag had a basicity of 1.55 as planned, and a chromium content in slag of 4.5%. Silico-chromium was collected by adding metal silicon to this primary slag. After collection of silico-chromium, the primary slag had a basicity of 1.35 and a chromium content of 0.8%. The primary slag was used as a subgrade material and was never weathered. The silicon content in the molten metal upon discharging the primary slag was confirmed to be 0.40% from the result of analysis of a sample taken from the molten metal.

After discharging the primary slag, 600 kg quicklime and 300 kg fluorspar were charged into the melting furnace body as a basic flux, and power was turned on again to melt quicklime and fluorspar to form a secondary slag. The molten metal was refined by means of the secondary slag. Refining was completed upon the lapse of about an hour and 30 minutes from the start of turn-on. The melting furnace body was tilted while disconnecting power. The molten metal was tapped, together with the secondary slag, and cast into a cast iron mold in which the primary slag was spread. Upon tapping, the molten metal had a temperature of 2,000° C., and the secondary slag had at that moment a basicity of 3.5 and a chromium content of 4.0%. The chromium yield was 87% in the first step, and 85% in the second step. When collecting chromium oxides not as yet collected by adding metal silicon to slag, a total yield of 95% was obtained.

After cooling, slag adhering to the surface was ground off by shot blast. After grinding, the ingot had a weight of about 3,000 kg. The power consumption, as derived from this ingot weight, was 3,500 kWh/t for the silicon reduction step, and 1,500 kWh/t for the refining step with the basic flux, leading to a total power consumption of 5,000 kWh/t. The chemical analysis values of the ingot are shown in Table 1. As is clear from Table 1, a metal chromium having a silicon content of 0.002%, an aluminum content of 0.001%, and a sulfur content of 0.0002% were obtained.

TABLE 1

Chemical composition of metal chromium

| | Chemical composition (mass %) | | | | | | | |
|---|---|---|---|---|---|---|---|---|
| | Cr | Si | Fe | P | Al | C | O | N | S |
| Ingot | 99.4 | 0.02 | 0.23 | 0.003 | 0.001 | 0.14 | 0.20 | 0.02 | 0.0002 |
| Product | 99.6 | 0.02 | 0.25 | 0.003 | 0.001 | 0.008 | 0.038 | 0.002 | 0.0002 |

The metal chromium ingot was crushed to a size smaller than 40 mm by three kinds of crusher, and charged into a vacuum heating furnace using a graphite heater. Temperature was raised to 1,350° C. while keeping a pressure of up to 13 Pa (0.1 torr) in the vacuum vessel, and the vessel was held at 1,350° C. for 50 hours. During this holding time, the pressure in the vacuum vessel was lower than 7 Pa (0.05 torr). Subsequently, the vacuum vessel was cooled while keeping a pressure of up to 13 Pa in the vacuum vessel to room temperature, and the vacuum vessel was released to the open air. An analytical sample was taken from metal chromium and the chemical composition was analyzed. The result of analysis is shown also in Table 1.

As is clear from Table 1, carbon, oxygen and nitrogen were removed by the vacuum heating treatment, and metal chromium having a very high purity was obtained. Iron contained in metal chromium in this Example resulted from metal silicon in the reducing agent. By using metal silicon having a high purity, it is possible to reduce also the iron content.

A metal chromium ingot in an amount of 300 kg was crushed on a rod mill into a size smaller than 0.5 mm, and carbon powder was blended thereto so as to achieve an atomic ratio of 0.9 relative to oxygen in metal chromium. A PVA 10% solution was mixed in an amount of 3% as a lump-making agent, the mixture being compressed and formed into briquettes, and then dried. The resultant briquettes were held at 1,350° C. under 13 Pa (0.1 torr) for 50 hours, and subjected to a vacuum heating treatment. The result of analysis is shown in Table 2.

TABLE 2

Chemical composition of metal chromium

| | Chemical composition (mass %) | | | | | | | |
|---|---|---|---|---|---|---|---|---|
| | Cr | Si | Fe | P | Al | C | O | N | S |
| Ingot | 99.6 | 0.04 | 0.24 | 0.003 | 0.001 | 0.061 | 0.112 | 0.02 | 0.0002 |
| Briquettes product | 99.7 | 0.04 | 0.25 | 0.003 | 0.001 | 0.006 | 0.008 | 0.001 | 0.0002 |

EXAMPLE 2

A raw metal manufactured by the aluminum-thermit process in an amount of 27 kg, 18 kg quicklime serving as a basic flux, and 12 kg fluorspar were mixed and the mixed raw material was charged in an arc melting furnace. The raw metal was refined through melting by turning on an electrode. Refining reduced the contents of aluminum, silicon and sulfur in the raw metal as shown in Table 3.

TABLE 3

Chemical composition of metal chromium

| | Chemical composition (mass %) | | |
|---|---|---|---|
| | Si | Al | S |
| Raw metal | 0.4 | 0.4 | 0.03 |
| Refined metal | 0.04 | 0.002 | 0.0002 |

According to the present invention, it is possible to economically and efficiently manufacture a high-purity chromium-containing metal having low contents of aluminum, silicon and sulfur, which was unavailable in the conventional methods including the aluminum-thermit process, the silicon reduction process and the electrolytic reduction process, thus providing industrially useful effect.

What is claimed is:

1. A manufacturing method of a chromium-containing metal, comprising the steps of:
    reducing a chromium oxide with silicon by heating and melting, in an arc melting furnace, the chromium oxide with sufficient silicon to obtain a primary slag and a molten metal containing at least 85 mass % chromium and more than 0.2 mass % and less than 1.0 mass % silicon;
    then, discharging the primary slag from the arc melting furnace;
    adding, after discharge of the primary slag, a basic flux into the arc melting furnace to melt the basic flux by electric arc to obtain a secondary slag;
    refining the molten metal containing at least 85 mass % chromium and silicon by contacting the secondary slag with said molten metal to form a refined molten metal with a silicon content which is reduced to below 0.1 mass %;
    and then, tapping the refined molten metal from the arc melting furnace and casting the refined molten metal to form cast chromium-containing metal.

2. A manufacturing method of the chromium-containing metal according to claim 1, wherein the cast chromium-containing metal is crushed, and the crushed chromium-containing metal is subjected to a vacuum heating treatment.

3. A manufacturing method of the chromium-containing metal according to claim 1, wherein the cast chromium-containing metal is crushed; the crushed chromium-containing metal is formed into briquettes; and then, the resultant briquettes are subjected to a vacuum heating treatment.

4. A manufacturing method of the chromium-containing metal according to claim 1, wherein said basic flux mainly comprises CaO.

5. A manufacturing method of the chromium-containing metal according to claim 4, wherein the cast chromium-containing metal is crushed, and the crushed chromium-containing metal is subjected to a vacuum heating treatment.

6. A manufacturing method of the chromium-containing metal according to claim 4, wherein the cast chromium-containing metal is crushed; the crushed chromium-containing metal is formed into briquettes; and then, the resultant briquettes are subjected to a vacuum heating treatment.

* * * * *